Sept. 2, 1924.    F. C. REED    1,506,943
VOLUME REGULATOR GAUGE
Filed July 12, 1923    2 Sheets-Sheet 1
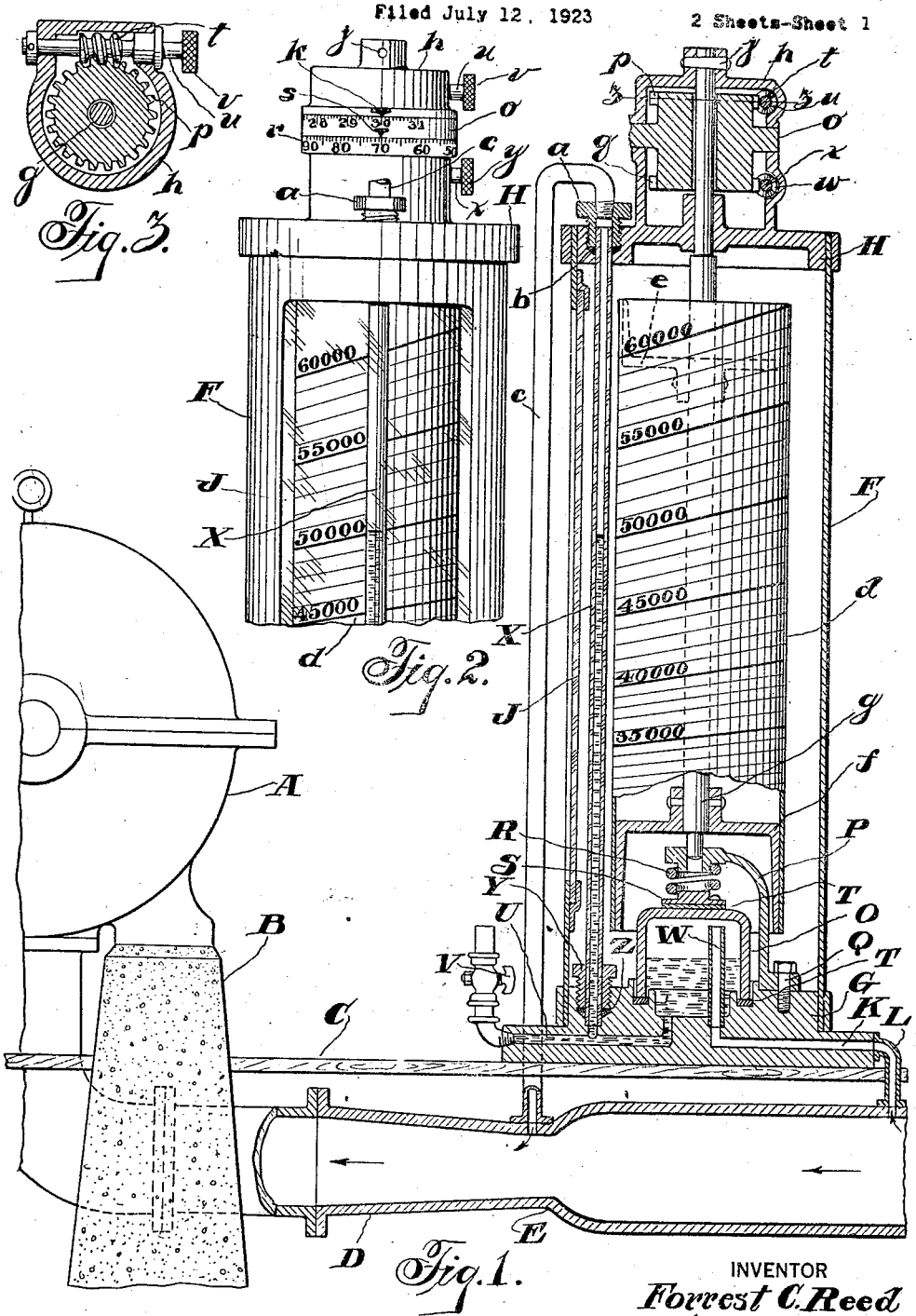

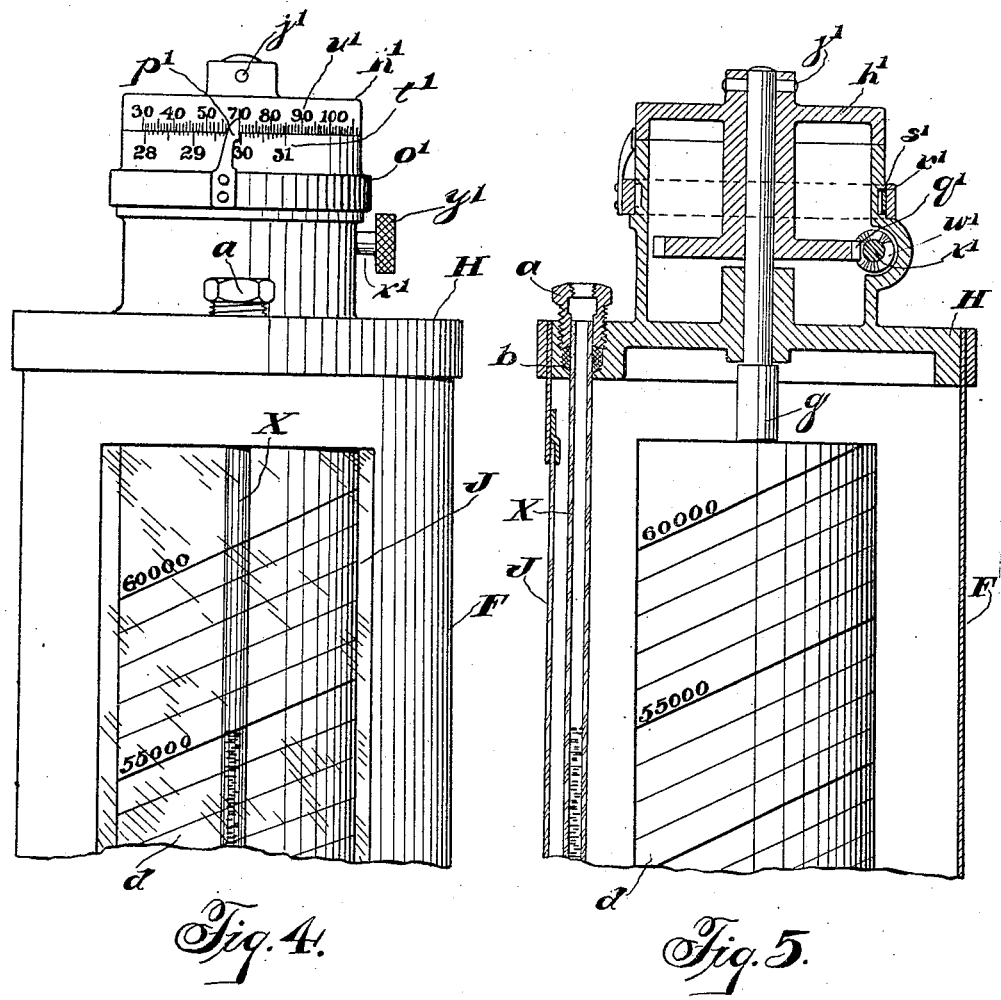

Patented Sept. 2, 1924.

1,506,943

UNITED STATES PATENT OFFICE.

FORREST C. REED, OF EASTON, PENNSYLVANIA, ASSIGNOR TO INGERSOLL-RAND COMPANY, OF JERSEY CITY, NEW JERSEY, A CORPORATION OF NEW JERSEY.

VOLUME-REGULATOR GAUGE.

Application filed July 12, 1923. Serial No. 651,098.

*To all whom it may concern:*

Be it known that I, FORREST C. REED, a citizen of the United States, and a resident of Easton, county of Northampton, and State of Pennsylvania, have invented a certain Volume-Regulator Gauge, of which the following is a specification accompanied by drawings.

This invention relates to a volume regulator gauge for constant volume governing of turbo blowers, turbo compressors, or similar machines.

The object of the invention is to enable the fluid volume supplied to a turbo blower, turbo compressor or similar machine, to be determined in a simple and improved manner.

Another object of the invention is to produce a gauge having a drum which may be adjusted for different barometric conditions, which will determine the fluid volume supplied to a turbo blower, turbo compressor, or similar machine, so that a constant weight of supplied oxygen may be maintained. By using a drum calibrated in fluid volumes under standard conditions, an extremely accurate reading may be obtained, as the calibrations may be on a larger scale thus giving a flatter curve.

Further objects of the invention will hereinafter appear, and the invention is shown in one of its preferred forms in the drawings, in which Figure 1 is a side elevation in vertical section of a volume regulator gauge connected to the intake of a turbo compressor;

Figure 2 is a detail fragmentary view in side elevation of the upper portion of the gauge, shown in Figure 1;

Figure 3 is a horizontal section taken on the line 3—3 of Figure 1;

Figure 4 is an enlarged detail view in side elevation of the upper portion of a modified form of the invention, and Figure 5 is an enlarged vertical sectional view of the upper portion of the gauge shown in Figure 4.

Referring to the drawings, a turbo compressor A is shown mounted in the usual manner on the foundation B, the floor line C being indicated for purposes of illustration. The intake conduit D of the compressor is preferably formed with a restricted portion in the form of a Venturi tube E, in which the velocity of the incoming fluid such as air, is increased, producing sub-atmospheric pressure since a Venturi tube has been found to be a convenient device for use in connection with a regulator gauge of the form described.

A cylindrical casing F is closed at the bottom by the block G and at the top by the cover H, and is provided with the sight opening J of glass or other suitable material. The block G is in this instance mounted on the floor line C and is formed with a longitudinal passage K, which communicates with the intake D through the pipe or tube L and serves to afford communication between the intake D and a reservoir O, which in this instance, is in the form of an inverted glass cup. A yoke P is connected to the block G, as by the bolts Q, and forms a seat for one end of a coiled spring R, which bears against a seat S on the reservoir O, thereby holding the reservoir in position on the block G. Washers T of felt or other suitable material may be placed between the spring seat and the reservoir, and between the reservoir and the seat S in order to prevent breakage of the reservoir. For supplying liquid, such as mineral oil, or mercury to the cup or reservoir O, a longitudinally extending passage U is formed in the block G, and admission of liquid to the passage U is controlled by a valve V. In order to prevent the liquid from flowing into the intake D from the reservoir, and to enable the air from the intake to pass to and from the surface of the liquid, a short pipe or tube W is placed in up-right position in the block G and is in communication with the passage K.

A tube X preferably of glass, is mounted in up-right position in the casing F, in rear of the glass window J, and is held in the block G by the gland nut Y and packing Z, and in the cover H by the gland nut $a$ and packing $b$. The upper end of the tube X is in communication with the restricted portion E of the intake D through the down take pipe or tube $c$ which has one end connected to the gland nut $a$. Liquid from the reservoir O is drawn out into the tube X by the difference in pressure existing in the tubes W and $c$ leading to the intake as described.

In order to determine the fluid volume supplied to the turbo compressor A, a drum $d$ calibrated in fluid volumes under standard conditions, is mounted on the upper and lower spiders $e$ and $f$ respectively, which are mounted in any suitable manner on the drum shaft $g$. The drum shaft $g$ has a bearing at one end in the yoke P and at the other end in the cover H. The height of the liquid column in the tube X due to the difference in pressure existing at different points in the intake D, indicates on the drum $d$ the fluid volume supplied to the compressor. The drum may be of card board, paper, brass or other suitable material, and is wrapped in any suitable manner about the spiders $e$ and $f$. A movable head $h$ is secured to the drum shaft $g$ by the pin $j$ and is provided with an indicator $k$. A movable disc $o$ loosely surrounds the drum shaft $g$ and is calibrated in barometric inches and is also formed with upper gears $p$ and lower gears $q$. The upper end portion of the cover H is provided with a scale $r$ calibrated in degrees of temperature and is adapted to cooperate with an indicator $s$ on the movable disc $o$ for changes in barometric conditions.

In order to adjust the drum $d$ for changes in barometric conditions, a worm $t$ mounted on a shaft $u$ having a knurled head $v$, meshes with the gear $p$, and by turning the head $v$ the indicator $k$ may be moved to indicate the barometric pressure on the movable disc $o$. A worm $w$ is mounted on a shaft $x$, having a knurled head $y$, and meshes with the gear $q$, and by rotating the head $y$, the indicator $s$ may be moved to indicate the temperature on the scale $r$. The arrangement of the worms $w$ and $t$ is such that when one is rotated, the other one will be locked, so that when the head $y$ is rotated, the worm $t$ will be locked to the gear $p$ and the head $h$, drum shaft $g$ and drum $d$, are all rotated. On the other hand when the head $v$ is rotated, the worm $w$ will be locked to the gear $q$ and the movable head $h$, drum shaft $g$ and drum $d$ are all rotated.

The indicator $k$, at all times, indicates the barometric pressure and the indicator $s$ at all times, indicates the temperature. These two indicators may be adjusted by the heads $v$ and $y$ for different barometric conditions, so that the drum $d$ will assume a correct position relative to the tube X, whereby the speed of the turbo compressor A may be increased or diminished, according to the indication given by the height of the liquid column in the tube X relative to the volume scale, and in this manner, the correct fluid volume to supply a constant weight of oxygen, may at all times be supplied to the turbo compressor A.

In the modification shown in Figures 4 and 5, the movable head $h'$ is rotatably connected to the drum shaft $g$ by the pin $j'$ and is formed with a gear $q'$ which meshes with a worm $w'$ mounted on a shaft $x'$, having a knurled head $y'$. By rotating the knurled head $y'$, the movable head $h'$, drum shaft $g$ and drum $d$ will be rotated. A ring $o'$ carries and indicator $p'$, surrounds the cover $h'$ and is frictionally held in position by a flat spring $r'$, in the groove $s'$. The cover H is provided with a scale $t'$ calibrated in barometric inches, and the movable head $h'$ is provided with a scale $u'$ calibrated in degrees of temperature. By rotating the movable head $h'$ by turning the head $y'$, the scales $t'$ and $u'$ may be adjusted for the existing barometric conditions. The indicator $p'$ may be set to indicate the barometric reading and then the scale $u'$ adjusted to the proper temperature. In all probability the barometric reading will remain the same throughout the day and the only change being the temperature, so that by setting the indicator $p'$ once a day for the barometric scale, the only adjustment necessary, will be for the slight change in temperature.

By using a drum the correction curves may be drawn to a large scale, thereby enabling a more accurate reading to be obtained than could be obtained with a plate on which the correcting curve must be drawn to a smaller scale.

I claim:

1. A volume regulator gauge for constant volume governing of turbo blowers and turbo compressors, comprising a rotatable drum having a scale calibrated in fluid volumes under standard conditions, indicating means adapted to be subjected to the intake pressure of the turbo machine adapted to indicate on the fluid volume scale the fluid volume supplied to the turbo machine, and means for adjusting the drum relative to said indicating means to compensate for changes in barometric conditions, whereby the fluid volume supplied to the turbo machine may be determined at all times.

2. A volume regulator gauge for constant volume governing of turbo blowers and turbo compressors, comprising a rotatable drum having a scale calibrated in fluid volumes under standard conditions, indicating means adapted to be subjected to the intake conditions of the turbo machine adapted to indicate on the fluid volume scale the fluid volume supplied to the turbo machine, and manually operated means for adjusting the drum relative to said indicating means to compensate for changes in barometric conditions, whereby the fluid volume supplied to the turbo machine may be determined at all times.

3. A volume regulator gauge for constant volume governing of turbo blowers and turbo compressors, comprising a rotatable drum having a scale calibrated in fluid volumes under standard conditions, liquid containing means containing a liquid column adapted to be subjected to the intake conditions of the turbo machine adapted to cooperate with the fluid volume scale, and manually operated means for adjusting the drum relative to said liquid column to compensate for changes in barometric conditions, whereby the fluid volume supplied to the turbo machine may be determined at all times.

4. A volume regulator gauge for constant volume governing of turbo blowers and turbo compressors, comprising a casing having a sight opening, a cover for one end of the casing, a shaft having a bearing in the cover, a rotatable drum calibrated in fluid volumes under standard conditions carried by the shaft, liquid containing means containing a liquid column adapted to be subjected to the intake conditions of the turbo machine adapted to cooperate with the fluid volume scale, and manually operated means for adjusting the drum relative to said liquid column to compensate for changes in barometric conditions, whereby the fluid volume supplied to the turbo machine may be determined at all times.

5. A volume regulator gauge for constant volume governing of turbo blowers and turbo compressors, comprising a casing having a sight opening, a cover for one end of the casing having a scale calibrated in degrees of temperature, a movable member having a scale calibrated in barometric inches adapted to be adjusted relative to the temperature scale for changes in barometric conditions, a drum in the casing calibrated in fluid volumes under standard conditions adapted to be adjusted for different barometric conditions by said movable member, and indicating means adapted to be subjected to the intake conditions of the machine, adapted to indicate on the fluid volume scale the fluid volume supplied to the turbo machine.

6. A volume regulator gauge for constant volume governing of turbo blowers and turbo compressors, comprising a base member, a reservoir carried by the base member, a cylindrical casing having one end closed by the base member and also having a sight opening, a cover for said casing having a scale calibrated in degrees of temperature, a shaft in the casing, a drum carried by the shaft calibrated in fluid volumes under standard conditions, a movable member calibrated in barometric inches adapted to cooperate with said temperature scale for adjusting the drum for different barometric conditions, and liquid containing means containing a liquid column adapted to be subjected to the intake conditions of the machine for indicating on the fluid volume scale the fluid volume supplied to the machine.

In testimony whereof I have signed this specification.

FORREST C. REED.